United States Patent [19]

Borchardt

[11] Patent Number: 4,852,653

[45] Date of Patent: Aug. 1, 1989

[54] METHOD TO OBTAIN RAPID BUILD-UP OF PRESSURE IN A STEAM FOAM PROCESS

[75] Inventor: John K. Borchardt, Houston, Tex.

[73] Assignee: Shell Oil Company, Houston, Tex.

[21] Appl. No.: 215,951

[22] Filed: Jul. 6, 1988

[51] Int. Cl.[4] .................... E21B 43/22; E21B 43/24

[52] U.S. Cl. ............................. 166/272; 166/274; 166/303; 252/8.554

[58] Field of Search ............ 166/272, 273, 274, 303; 252/8.554

[56] References Cited

U.S. PATENT DOCUMENTS

| | | |
|---|---|---|
| 3,292,702 | 12/1966 | Boberg . |
| 3,357,487 | 12/1967 | Gilchrist et al. . |
| 3,412,793 | 11/1968 | Needham . |
| 3,515,214 | 6/1970 | Finch ................................ 166/272 |
| 3,993,133 | 11/1976 | Clampitt ............................ 166/272 |
| 4,068,717 | 1/1978 | Needham .......................... 166/272 |
| 4,086,964 | 5/1978 | Dilgren et al. .................... 166/272 |
| 4,393,937 | 7/1983 | Dilgren et al. .................... 166/272 |
| 4,445,573 | 5/1984 | McCaleb ...................... 166/272 X |
| 4,488,598 | 12/1984 | Duerksen ........................... 166/252 |
| 4,488,976 | 12/1984 | Dilgren et al. ................. 252/8.554 |
| 4,532,993 | 8/1985 | Dilgren et al. .................... 166/303 |
| 4,540,050 | 9/1985 | Huang et al. ..................... 166/272 |
| 4,556,107 | 12/1985 | Duerksen et al. ................ 166/272 |
| 4,597,442 | 7/1986 | Dilgren et al. .................... 166/272 |
| 4,607,700 | 8/1986 | Duerksen et al. ................ 166/303 |
| 4,609,044 | 9/1986 | Lau .................................... 166/270 |
| 4,610,304 | 9/1986 | Doscher ...................... 166/272 X |
| 4,617,995 | 10/1986 | Lau .................................... 166/272 |
| 4,643,256 | 2/1987 | Dilgren et al. .................... 166/303 |

Primary Examiner—George A. Suchfield

[57] ABSTRACT

An improvement to a steam foam enhanced oil recovery process, whereby the time between injection of a surfactant and the resulting increase in steam injection pressure is reduced by initially injecting a rapidly-foaming surfactant, such as an internal olefin sulfonate, a vinylidene olefin sulfonate, or secondary alkane sulfonate, and subsequently injecting a typical steam foam surfactant that forms foam less rapidly.

13 Claims, No Drawings

METHOD TO OBTAIN RAPID BUILD-UP OF PRESSURE IN A STEAM FOAM PROCESS

BACKGROUND OF THE INVENTION

This invention relates to a steam foam enhanced oil recovery process. More specifically, this invention relates to an improved method of displacing oil within a subterranean reservoir by injecting into the reservoir steam and an improved steam foam surfactant, which rapidly forms a strong steam foam in the reservoir and may be used in combination with other steam foam surfactants.

Many hydrocarbons or oils are too viscous to be recovered from subterranean reservoirs without assistance. These heavy oils can be recovered through the use of steam drives which heat the formation, lower the viscosity of oil, and enhance the flow of oil toward a production well. However, after initial injection breakthrough at the production well, the injected steam preferentially follows the breakthrough path. Also, except near the injection and production wells, the active steam zone in the reservoir tends to rise to the upper levels of the oil-bearing formation. Thus, the total amount of the formation that is swept by the steam injection is limited.

Surfactants have been injected along with steam to create a surfactant-enhanced steam foam flood. The combination of steam and steam foam surfactant results in a steam foam, which is a dispersion of steam vapor in a continuous water phase, wherein at least part of the steam vapor phase is made discontinuous by liquid films, or lamellae. The presence of this foam is exhibited by a reduction in the rate at which the steam travels through the reservoir. The foam reduces mobility of the steam both in the upper levels of the oil-bearing formation, and toward the production well. This mobility reduction results in more efficient heat transfer to the oil, which increases oil recovery at the production well and results in lower average residual oil saturation in the reservoir when the steam foam drive is completed.

Numerous prior processes have involved various uses of steam in conjunction with a surfactant, and improvements to such processes. U.S. Pat. No. 3,292,702 suggests a steam soak process in which an aqueous surfactant is injected ahead of the steam to provide an increased injectivity during the steaming period and a greater rate of production during backflow. U.S. Pat. No. 3,357,487 reveals injecting a solution of surfactant prior to or during a steam injection so that a band of the surfactant solution is displaced by the steam. U.S. Pat. No. 3,412,793 suggests that, in a relatively highly stratified reservoir, a steam soak or steam drive process for recovering oil is improved by temporarily plugging the more permeable strata with foam. U.S. Pat. No. 4,086,964 discloses recovering oil by injecting a steam foam-forming mixture through a steam channel which extends essentially between injection and production wells. U.S. Pat. Nos. 4,393,937 and 4,488,976 describe a steam foam-forming mixture in which the surfactant is a particularly effective alpha olefin sulfonate as well as methods of using such a mixture in steam drive or steam soak oil recovery processes. U.S. Pat. No. 4,488,598 discloses a steam and gas distillation drive using a foamable surfactant. U.S. Pat. No. 4,597,442 suggests a preflushing solution for increasing the rate at which the injected steam foaming surfactant is propagated through the reservoir by reducing ion-exchange effects. U.S. Pat. Nos. 4,556,1107 and 4,607,700 disclose a steam foam injection process improved by the use of alpha olefin sulfonate dimer surfactants. U.S. Pat. No. 4,609,044 describes an alkali-enhanced steam foam drive or soak process for recovering low gravity acidic oil. U.S. Pat. No. 4,617,995 discloses injection of a pretreating fluid ahead of at least some of the steam and steam foaming surfactant to increase the rate of surfactant transport and decrease the amount of surfactant required. U.S. Pat. No. 4,643,256 suggests a steam foaming surfactant mixture which is effective even in the presence of multivalent cations.

Until a steam foam drive is completed, the major indicators of the effectiveness of the operation, and of whether or not foam has formed in the formation, are the injection pressure and a temperature profile. An increase in steam injection pressure indicates that mobility of the steam within the reservoir has been reduced. A temperature profile that is relatively uniform, over that portion of the formation into which steam is injected, indicates that the steam is being deflected from breakthrough paths and zones of greater permeability, and is advancing through the formation as a uniform front. The steam injection pressure is easy to determine from equipment used on the surface as part of a steam foam drive operation. However, the formation temperature profile, which indicates the relative amounts of steam entering the formation at various depths, requires the use of downhole equipment to measure the temperature of the formation at various depths. Also, such a profile is best determined from an observation well, rather than the well where steam injection occurs. Consequently, although steam injection pressures are monitored on an ongoing basis, temperature profiles are determined only infrequently.

To maximize the rate at which oil is recovered, it is desirable to use a steam foam surfactant which forms foam rapidly in the reservoir. When foam forms rapidly, and after the surfactant has traveled only a short distance through the formation, the beneficial effects of foam will occur closer to the wellbore. These beneficial effects include steam mobility reduction, more efficient heat transfer, and additional oil recovery. The foam will impact a greater portion of the target formation if it is formed closer to the wellbore. This incremental effect may be particularly significant in steam soak operations, which typically impact a smaller target volume within the formation than steam drive (well-to-well) operations.

Once injection of a typical steam foam-forming mixture starts, there is often a lengthy period of time, which may be from a day to several weeks, before foam forms and an increase in steam injection pressure is observed. Foam generation may be delayed by interaction of the surfactant with the residual oil saturation near the wellbore, by adsorption of the initially injected surfactant on reservoir mineral surfaces, or by the nature of the permeability distribution in the near-wellbore region of the formation. Usually, the steam foam surfactant must travel some minimum distance through the reservoir before it forms a foam. When foam formation does not occur within the expected time period, the operator will often take expensive remedial steps, such as increasing the concentration of surfactant injected. Alternatively, particularly when a significant amount of time has elapsed without a pressure increase, the operator may simply eliminate surfactant injection and abandon the recovery project. In such situations, rapid foam formation offers the practical advantage of providing the operator with a positive and rapid indication that the enhanced oil recovery process is operating as desired. This can prevent both a potentially uneconomic use of surfactant injected into the formation, and premature abandonment of a potentially successful recovery project.

As part of this invention, a group of surfactants which generate foam rapidly, and are suitable for use as steam foam surfactants, is identified. The foam strength provided, and oil recovery produced, by the rapidly foaming surfactants appears at least comparable to those of steam foam surfactants currently in use. However, these surfactants currently cost more than some other steam foam surfactants, and may, for that reason, be considered less desirable for use in a steam foam recovery process. Since the beneficial effects of foam occur more rapidly and closer to the wellbore when rapidly foaming surfactants are used, it is expected that oil may be recovered more rapidly, thus the use of rapidly foaming surfactants may provide some economic benefit to offset their higher unit cost. In order to cost-effectively utilize the rapidly foaming surfactants, a multi-stage injection procedure, injecting first a rapidly foaming surfactant with the steam, and then injecting a less rapidly foaming conventional surfactant with the steam may be used. It is also speculated that, when used in combination with other steam foam surfactants, the rapidly foaming surfactants may also be effective at sustaining the steam foam in the formation.

SUMMARY OF THE INVENTION

The present invention relates to an improved process for recovering oil by injecting a mixture of steam and steam foam surfactant into an oil-containing subterranean formation. It is applicable to both steam drive and steam soak operations. The improvement is provided by using a rapidly foaming steam foam surfactant, either alone or in combination with a second steam foam surfactant in a multi-state surfactant injection process. In the multi-stage injection process, a surfactant which exhibits rapid foam formation in an oil-containing subterranean reservoir is injected first with the steam. In the second injection stage, any other steam foam surfactant which forms a strong foam, such as, for example, alpha olefin sulfonate, alkyltoluene sulfonate, alkyxylene sulfonate, or alpha olefin sulfonate dimer, is injected with the steam. The steam foam-forming mixtures used in each surfactant injection stage preferably include, in addition to steam and steam foam surfactant, an aqueous solution of electrolyte, and optionally also include a noncondensible gas, with each of the components being present in proportions effective for steam foam formation in the presence of reservoir oil. It may be desirable, particularly in a steam soak process, to sequentially repeat the first and second injection stages.

The present invention also relates to the rapidly foaming steam foam surfactants, and mixtures thereof, which are disclosed herein. These rapidly foaming surfactants have the following general formula

Where:
m=1−33,
n=0 or 1,
p=0−10,
q=0 or 1,
s=1−10 when q=1, or 2−10 when q=0,
M=sodium, potassium, or ammonium, and
m+2n+p+1+q+s=10−36.

Included among the preferred surfactants of this general formula are internal olefin sulfonates, vinylidene olefin sulfonates, and secondary alkane sulfonates. The rapidly foaming surfactants of the present invention have a carbon number in the range of about 10–36 preferably in the range of about 14–24 and most preferably in the rangne of about 16–20.

DETAILED DESCRIPTION OF THE INVENTION

The present invention is, at least in part, based on a recovery that the use of rapidly foaming steam foam surfactants in the initial stage of a multi-stage steam foam process provides unexpected advantages in both steam drive and steam soak enhanced oil recovery processes. The rapidly foaming surfactants of the present invention foam after traveling a shorter distance in the subterranean formation, and generate increased injection pressures more rapidly, than conventional surfactant which have been considered to be among the best available for steam foam operations.

For example, where the steam foam mixture contains steam, a secondary alkane sulfonate, an electrolyte, and a noncondensible gas in proportions near optimum for foam formation in the presence of oil, the steam foam mixture of this invention will provide much more rapid foam formation, while still greatly reducing steam mobility within the reservoir, relative to previously used steam foam surfactants. Laboratory experiments also indicate that internal olefin sulfonate surfactants generate foam in a fraction of the time of alpha olefin sulfonate surfactants of a similar molecular weight.

In the process of the subject invention the rapidly foaming steam foam surfactant is injected, in an amount sufficient to generate foam in the formation. Preferably, a typical steam foam surfactant, which does not foam rapidly, is injected after the rapidly foaming surfactant. The typical steam foam surfactant will be a majority of the total amount of surfactant injected into the formation in a multi-stage injection process, and preferably as much as 80 to 95% or more of the total weight of surfactant injected (or volume if the two surfactant solutions contain the same concentration of surfactant). It may be desirable, particularly in a steam soak process, to sequentially repeat the first and second injection steps of the multi-stage injection process.

Included among the preferred surfactant compositions of the present invention, which foam more rapidly than steam foam surfactants currently in use, are internal olefin sulfonates and vinylidene olefin sulfonates of the following general formula:

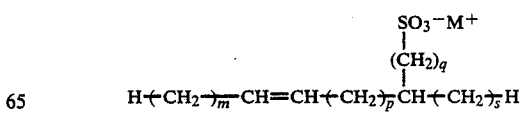

Where:
m=1−31, p=0—10,
q=0 or 1,
s=1—10 when q=1, or 2—10 when q=0,
M=sodium, potassium, or ammonium, and
m+2+p+1+q+s=10—36.

Particularly preferred surfactant compositions of the present invention, which foam more rapidly than steam foam surfactants currently in use, are secondary alkane sulfonates of the following general formula:

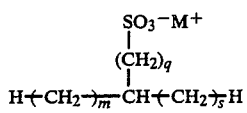

Where:
m=1—33,
q=0 or 1,
s=1—10 when q=1, or 2—10 when q=0,
M=sodium, potassium, or ammonium, and
m+1+q+s=10—36.

The rapidly foaming surfactants suitable for use in the present invention may be derived from internal olefins. The internal olefin sulfonates and vinylidene olefin sulfonates may also be derived from vinylidene olefins. These olefins have a carbon number in the range of about 10–36, preferably in the range of about 14 to 24, and most preferably in the range of about 16 to 20. Particularly suitable for the purposes of the present invention are internal olefin sulfonates or secondary alkane sulfonates derived from substantially linear internal olefins. Internal olefin sulfonates derived from branched chain internal olefins are also suitable for the purposes of the present invention provided that the chain branches are no more than about two carbon atoms in length. Conventional manufacture of such surfactants typically yields an aqueous solution of surfactant, for example, a 15–30 w% solution in water. Such solutions, after dilution, may be directly utilized in the preparation of steam foam mixtures for purposes of this invention.

In order to reduce the cost associated with use of the rapidly foaming surfactants of the present invention, the initial injection of the rapidly foaming surfactant is preferably followed by injection of a lower cost steam foam surfactant which may not foam as rapidly. Such a surfactant may be an anionic surfactant which is both suitable for use in a steam foam operation and compatible with the initially injected rapidly foaming surfactant. Suitable surfactants include alpha olefin sulfonates (including those enriched in disulfonate), alkyltoluene sulfonates, alkyxylene sulfonates, and alpha olefin sulfonate dimer surfactants. The preparation of solutions of these steam foam surfactants, and their use in a steam foam process would be similar to that described herein for the rapidly foaming surfactants.

The steam foam mixtures of the present invention are formed by combining (a) steam foam surfactant, present in a liquid solution in an amount between about 0.01 and 10 wt % (calculated on the weight of the liquid solution), and (b) steam which, under reservoir conditions, is present in both a liquid phase and a gas phase. An electrolyte, present in a liquid solution in an amount between about 0.01 and about 15 wt % or more (calculated on the weight of the liquid solution) is preferably included in the steam foam mixture. A gas is also preferably included in the steam foam mixture, in an amount between about 0.01 and about 50 mol % or more (calculated on total moles present in the vapor phase of the steam foam mixture). The steam foam mixture is preferably formed by injecting surfactant solution into the wet steam. The gas is also preferably injected into the steam. Preferably, the surfactant is injected in as small an amount as necessary to enhance oil recovery. Typically, a surfactant solution containing about 0.1 to about 5 wt % surfactant, or preferably a solution containing about 0.1 to about 0.5 wt % surfactant, is injected into the steam. The electrolyte is preferably combined with the surfactant solution prior to injection into the steam.

The steam used in the present process and/or mixtures can be generated at any surface or downhole location and supplied in the foam of any dry, wet, superheated, or low grade steam in which the steam condensate and/or liquid components are compatible with, and do not inhibit, the foam forming properties of the steam foam mixtures of the present invention. It is preferable that the quality of the steam as generated and/or amount of aqueous liquid with which it is mixed be such that the steam quality of the resulting mixture is about 10 to 90 wt %, and more preferably, about 30 to 80 wt %, at the time it enters the reservoir. The water used for forming the steam can contain other additives which enhance its properties, such as scale inhibitors and the like. The water can also contain low concentrations of salts.

The presence in the steam foam mixture of an electrolyte may substantially enhance the formation of a foam capable of reducing residual oil saturation. Some or all of the electrolyte can comprise an inorganic salt, preferably an alkali metal salt, more preferably in alkali metal halide, and most preferably sodium chloride. Other inorganic salts, for example, halides, sulfates, carbonates, bicarbonates, nitrates, and phosphates, the form of salts of alkali metals or alkaline earth metals, can also be used. The presence of an added electrolyte may be unnecessary when the steam injected, or the connate waters present in the reservoir, contain enough electrolyte to form an effective foam.

In general, the gas used in a steam foam mixture of the present invention can comprise substantially any gas which (a) undergoes little or no condensation at the temperatures and pressures at which the steam foam mixture is injected into and displaced through the reservoir, and (b) is substantially inert to and compatible with the steam foam surfactant and other components of that mixture. Such a gas is preferably nitrogen, but can comprise other gases, such as air, carbon dioxide, carbon monoxide, ethane, methane, flue gas, fuel gas, produced gas, reservoir gas, or the like, or mixtures thereof. Preferred concentrations of gas in the steam foam mixture fall in the range of from about 0.01 to about 50 or more mol % of the gas phase of the mixture.

Any standard method of creating a steam foam is suitable for use in the invention. A preferred process of creating the foam and sweeping the formation is disclosed in U.S. Pat. No. 4,086,964, completely incorporated herein by reference. Alternatively, the procedures outlined in U.S. Pat. No. 4,556,107 can be employed. The procedures outlined in U.S. Pat. No. 4,393,937, completely incorporated herein by reference, can be used with producing formations that contain zones of high permeability and/or are susceptible to channeling.

Once a rapidly foaming surfactant is injected into the formation, a foam may form within a few hours, perhaps in about six hours or less, and in some cases in as little as about 30 minutes. For secondary alkane sulfonate surfactants, foam may form even faster. The foam generated by a rapidly foaming surfactant will form near the injection well, at least as close as about five to six feet from the injection well, perhaps as close as about two feet or less from the injection well. Typical steam foam surfactants, when initially injected, do not foam or foam too far from the well to provide an injection pressure increase. Only after continued injection of surfactant does the foam form near enough to the wellbore to provide an increase in injection pressure.

The steam foam mixture is injected into the reservoir at a rate determined by reservoir characteristis and well pattern area. The injection and production wells can be arranged in any pattern. Preferably, the injection well is surrounded by production wells; however, the invention is also applicable to a steam soak (single well) process.

EXPERIMENTAL RESULTS

Experiments were conducted to measure (1) the time for foam generation and/or pressure increase to occur in sand packs designed to simulate reservoir conditions, and (2) the interfacial tension of surfactant solutions against oil.

Surfactant Sample Preparation

The surfactants evaluated are listed in Table 1. Two methods were used to prepare surfactants for laboratory evaluation: (1) sulfonation of olefins using vapor phase sulfur trioxide, and (2) reaction of olefins with hydrogen sulfide followed by reaction with hydrogen peroxide in glacial acetic acid. The first method was used to prepare AOS 1618, LTS 18, IOS 1517, and IOS 1720. The second method was used to prepare SAS 16. A sample of LTS 1518 had been obtained from the manufacturer.

In both sample preparation methods, the chemical reaction was followed by neutralization with sodium hydroxide. When olefins were sulfonated with sulfur trioxide, the neutralization was followed by a hydrolysis step performed under pressure at 140° C. When olefins were reacted with hydrogen sulfide and hydrogen peroxide, the acetic acid was removed from the reaction mixture under vacuum prior to nenutralization of the resultant secondary alkane sulfonic acid. Removal of the acetic acid was facilitated by addition of ethanol or isopropanol to the reaction mixtures. Both methods produced an aqueous solution of sulfonates.

Three of the surfactants tests, AOS 1618, LTS 18, and LTS 1518, may be considered examples of typical steam foam surfactants, and all three have been commercially used in steam foam operations. The remaining surfactants tested, IOS 1517, IOS 1720, and SAS 16, were determined to be rapidly foaming steam foam surfactants.

TABLE 1

| Analysis | STEAM FOAM SURFACTANT COMPOSITIONS | | | | | |
|---|---|---|---|---|---|---|
| | AOS 1618 | LTS 18 | LTS 1518 | IOS 1517 | IOS 1720 | SAS 16 |
| Molecular weight | 356 | 441 | ~418 | 348 | 380 | 306 |
| Unsulfonated organic material, % by weight | 0.3 | 1.6 | 0.8 | 2.4 | 5.2 | ND |
| Mono:disulfonate ratio | 89:11 | NA | NA | 96:4 | 92:8 | 100:0 |
| Alkene:hydroxy alkane sulfonate ratio | 68:32 | NA | NA | 60:40 | 64:36 | NA |
| Substrate olefin: | | | | | | |
| % alpha olefin | 94.9 | ND | ND | 4.0 | 4.3 | <1 |
| % branching | 3.8 | ND | ND | 9-10 | 22 | ND |

Abbreviations and Notes:
AOS = alpha olefin sulfonate
LTS = alkyltoluene sulfonate
IOS = internal olefin sulfonate
SAS = secondary alkane sulfonate
NA = not applicable
ND = not determined
The numbers after the abbreviations for surfactant compositions refer to the carbon number (16 or 18) or the carbon number range (16-18, 15-17, or 17-20) of the olefin used to prepare the alkyltoluene, olefin sulfonate, or secondary alkane sulfonate.
The AOS 1618 used was ENORDET ® AOS 1618, a commercially manufactured alpha olefin sulfonate available from Shell Chemical Company. The LTS 18 is a developmental product available from Shell Chemical Company. The AOS 1618 and LTS 18 products have been used in commercial steam foam enhanced oil recovery projects in California, Canada, and Venezuela. The LTS 1518 was formerly sold under the trade name SUNTECH IV ® 1035 by Sun Refining and Marketing Company, and has been used in a number of steam field tests in California.

Experimental Procedures

Steam injection studies were performed using sand packs designed to model the relatively high permeabilities of many unconsolidated or poorly consolidated California heavy crude oil reservoirs. Flow rates were designed to model a region of the formation near the injection wellbore. By means of such tests, determinations are made of the proportions of surfactant, noncondensible gas, and electrolyte components which are needed in a steam of the quality to be used to provide the desired treatment for a specific reservoir. Such tests are also used to compare the foaming properties of different surfactants.

Experiments were conducted by flowing steam-containing fluids through oil-containing Ottawa sand packs having a permeability of approximately three darcies. Porosity of the sand packs was 30-35%. The sand pack apparatus consisted of a cylindrical tube about 1.5 inches in diameter by 12 inches long. The tube was oriented vertically with flow from the bottom to the top. Pressure taps were located near the sand pack inlet (tap 1) and two additional pressure taps (taps 2 and 3) were located along the length of the sand pack, so as to divide the sand pack approximately into thirds. A back pressure regulator set at 100 psig was placed downstream of pressure tap 3.

Foam strength and the rapidity of foam development were both indicated by increased pressure drops across the test column. In most of the experiments, the injected steam foam mixture initially flowed through a 29-inch stainless steel capillary column (0.02 inches internal diameter) so as to introduce a pressure drop prior to the injected fluid contacting the sand pack, thereby assisting in foam formation. In one test, a nickelplated capillary column of the same size was used instead of the stainless steel column. In some tests, as an alternative, a column cool-down period was employed to promote foam formation.

The sand packs were prepared by flooding them with Kern River Field (Patricia Lease) oil, a heavy California crude, at a temperature of about 200° F. to provide initial oil saturations in the order of 80% to 90% of the sand pack pore volume. After saturating with oil, the sand packs were flooded with hot water followed by approximately 50% quality steam to reduce the oil content to an initial residual oil saturation ($ROS_i$) before surfactant injection. Test temperature was approximately 280° F. (temperature varied somewhat due to pressure changes). The surfactant solution and nitrogen were then co-injected with steam into the sand pack at constant rates. Surfactant concentration was 0.5 wt % in an aqueous solution, which also contained 3 wt % sodium chloride. Nitrogen was also co-injected at about 3 wt % relative to the steam volume.

As each experiment was conducted, a pressure increase occurred within the sandpack, indicating the formation of foam. Pressure was monitored along the sand pack (taps 1–3) as a function of time, and the elapsed time for the pressure increase to occur at each pressure tap ($TPI_n$) was determined for each experiment. The permeability reduction factor (PRF), the ratio of the sand pack's permeability to steam in the presence of surfactant to the sand pack's permeability to steam alone, was determined for each experiment. The final rsidual oil saturation ($ROS_f$), after steam injection, was also determined in most experiments, and the percent of ROS recovered was calculated for most experiments.

Interfacial tension (IFT) experiments were conducted using a University of Texas Model 500 Spinning Drop Tensiometer. Tests were conducted at 75° C. using 0.5 wt % surfactant in solution. The surfactant solvent was fresh water or aqueous 3 wt % sodium chloride solution. The soil was Kern River Field crude oil (Patricia Lease), a typical heavy California crude oil. This was the same oil used in the steam foam sand pack tests. The tensiometer sample tube was first rinsed with the surfactant solution (to prevent the viscous oil from sticking to the tube), then 0.005 grams of oil were weighed into the tube, and the tube was then filled with the surfactant mixture. Once the oil droplets were stabilized in the tensiometer, measurements were made to allow calculation of the IFT.

Foam Generation Sand Pack Tests

Results of the foam generation sand pack experiments are shown n Table 2. Of the surfactants tested, AOS 1618, LTS 18, and LTS 1518 may be considered typical steam foam surfactants commercially used in steam foam operations. The remaining surfactants evaluated, IOS 1517, IOS 1720, and SAS 16, were determined to be rapidly foaming steam foam surfactants on the basis of these experiments.

In comparing the results shown in Table 2, it is important to compare only tests performed using the same experimental procedures. The method used to promote foam development was the only available in the experimental procedures. Although the primary method used to enhance foam formation was a stainless steel capillary tube, one experiment used a nickel-plated capillary tube and two others used a cool-down step instead of a capillary tube. This aspect of the experimental design, for unknown reasons, appeared to impact the results. For LTS 18, the use of a nickelplated capillary tube (Test 72) provided faster foam formation than the stainless steel tube (Test 71). For SAS 16, the use of a cool-down step (Test 27) provided faster foam formation than use of the capillary tube (Test 28). Although the use of any of these procedures to enhance foam development allows experiments to be performed in a shorter time period, and the use of a stainless steel capillary tube may provide more uniform results, the use of a cool-down step may be more representative of what actually happens in the field. This is because initially injected fluids will lose heat as they travel down the well. If the target formation is relatively cool, the fluids will also lose heat upon entering the formation.

TABLE 2

| | STEAM FOAM FLOOD SAND PACK DATA | | | | | | |
|---|---|---|---|---|---|---|---|
| Test | Surfactant | $TPI_1$ (min) | $TPI_2$ (min) | $TPI_3$ (min) | PRF | $ROS_i$ | $ROS_f$ | % ROS Recovered |
| 66[1] | AOS 1618 | 120 | 180 | 190 | 0.04 | ND | ND | ND |
| 67 | AOS 618 | 40 | 210 | 275 | 0.04 | ND | ND | ND |
| 71 | LTS 18 | 80 | 90 | 95 | 0.031 | 0.311 | 0.161 | 48.3 |
| 72[2] | LTS 18 | 27 | 35 | 40 | 0.046 | 0.336 | 0.160 | 52.4 |
| 24[3] | LTS 1518 | 280 | 470 | 560 | 0.014 | 0.245 | 0.042 | 83.0 |
| 68 | IOS 1517 | 10 | 40 | 60 | 0.07 | 0.288 | 0.161 | 44.0 |
| 69 | IOS 1720 | 30 | 42 | 72 | 0.040 | 0.282 | 0.143 | 49.1 |
| 70 | IOS 1720 | 25 | 41 | 65 | 0.050 | 0.274 | 0.157 | 42.9 |
| 28 | SAS 16 | 20 | 45 | 60 | 0.026 | 0.304 | 0.164 | 46.0 |
| 27[3] | SAS 16 | ND[4] | <10 | <10 | 0.016 | 0.296 | 0.216 | 27.0 |

Abbreviations and notes:
PRF = Permeability Reduction Factor. This is the stabilized post-surfactant injection value. This pressure drop ratio is equivalent to the permeability ratio since other test variables were kept constant.
$TPI_n$ = Time for Pressure Increase. Time in minutes, required for the pressure to increase from the injection port to the indicated pressure tap n.
$ROS_{i/f}$ = Residual Oil Saturation, i = initial, f = final. Initial ROS is after steam injection and prior to surfactant/steam injection. Final ROS is after surfactant/steam injection is completed. % ROS recovered is based on initial ROS, after steam injection.
ND = Not determined.
[1]One side of the brine pump malfunctioned late in the experiment. This did not affect the results obtained early in the experiment including the TPI values at pressure taps 1, 2, and 3.
[2]A nickel-plated capillary tubing was used instead of the stainless steel capillary tubing.
[3]No capillary tubing was placed ahead of the sand pack. A cool-down step was employed instead.
[4]Pressure development was so rapid, it could not be accurately determined.

Surfactants which exhibit rapid foam generation within the reservoir are effective at achieving near-wellbore steam foam formation, and may also be effective at sustaining the steam foam drive operation within the reservoir. Actual foam generation times for specific field locations are dependent on field properties, but it may be assumed that, for a given field, foam generation would occur at times relative to those shown in these experiments. It should be noted that small TPI values indicate the injection of less surfactant is required to form a foam and to achieve steam mobility control. Of the typical steam foam surfactants, LTS 18 (Test 71) demonstrated the most rapid pressure increase, with a $TPI_3$ of 95 minutes. The slowest to foam was AOS 1618, which provided $TPI_3$ values of 190 and 275 minutes. All of the rapidly foaming surfactants had $TPI_3$ values of 60 to 72 minutes. When $TPI_1$ values are compared, it is also clear that SAS 16 (Test 28), IOS 1517, and IOS 1720 foam more rapidly than the other surfactants. The molecular weights of AOS 1618 (356) and IOS 1517 (348) are similar, yet the two demonstrated dramatically different TPI values. It may be concluded that this rapid foam generation phenomena is not due to a surfactant molecular weight effect. For the two tests run with a cool-down step, foam formation for SAS 16 (Test 27) was virtually instantaneous, while foam formation for LTS 1518 (Test 24) was the slowest for any of the tests of the typical steam foam surfactants.

A low permeability reduction factor (PRF) shows that the mobility of the steam injected is reduced by the presence of surfactant, consequently, PRF can serve as an indication of foam strength. The PRFs for the two groups of surfactants are comparable. For the typical steam foam surfactants, PRFs ranged from 0.014 to 0.046. For the rapidly foaming surfactants, the PRFs ranged from 0.016 to 0.050, with the exception of IOS 1517, which demonstrated a PRF of 0.07. Even a PRF as high as 0.07 is still considered very good.

The most important result in any enhanced oil recovery operation is the amount of oil recovered. For this reason, the incremental ROS recovered by the steam floods was calculated for most experiments. Comparisons of test results for ROS recoveries are complicated by the fact that the experiments were conducted over different time periods. Once a pressure increase had occurred all along the sand pack, the experiment was terminated and ROS was determined. Consequently, the values for % ROS recovered must be viewed in light of $TPI_3$ values. LTS 18 (Test 71) provided 48.3% ROS recovered, which is comparable to the 49.1% ROS recovered achieved by IOS 1720 in Test 69. However, the LTS 18 value was achieved after about 95 minutes, while the IOS 1720 value was obtained after only 72 minutes. The ROS recoveries achieved by the other rapidly foaming surfactants are slightly lower, but were also obtained over considerably shorter time periods. It is clear that the long time required to complete the experiment with LTS 1518 (560 minutes) was a factor in the relatively high oil recovery (83%) that occurred. Likewise, the short period of time required to complete one of the experiments with SAS 16 (less than 10 minutes in Test 27) was a factor in the relatively low oil recovery (27%) that occurred. These tests show that the rapidly foaming surfactants are capable of achieving oil recoveries that are at least comparable to those possible with conventional surfactants, and over shorter time periods.

Interfacial Tension Measurements

Surfactants which provide a low interfacial tension (IFT) generally accomplish a more efficient oil displacement. The IFT measurements for several of the surfactants evaluated in sand pack experiments are shown in Table 3. Results for AOS 1618 and LTS 18 represent the conventional surfactants, while the results for IOS 1517 and IOS 1720 represent the rapidly foaming surfactants. It should be noted that surfactants were combined with a 3 wt % sodium chloride solution for the steam foam sand pack

TABLE 3

| INTERFACIAL TENSION MEASUREMENTS | | |
|---|---|---|
| | Interfacial Tension at 75° C. (dynes/cm) | |
| Surfactant | 0% NaCl | 3 wt % NaCl |
| AOS 1618 | 2.6 | 0.47 |
| LTS 18 | 0.31 | ND[1] |
| IOS 1517 | 1.9 | 0.77 |
| IOS 1720 | 1.5 | 0.36[2] |

Notes:
[1]ND = not determined. Surfactant was not completely soluble in aqueous 3 wt % NaCl.
[2]Solvent was aqueous 2 wt % NaCl.

experiments. Although no value was determined for LTS 18 in sodium chloride solution, it may be assumed that the value would be less than 0.31 dynes/cm.

Since the presence of residual oil in the formation may slow surfactant propagation and foam formation, it might be assumed that a surfactant that provides efficient oil displacement would also foam rapidly. And if oil displacement efficiency played a major role in rapid foam formation, one would expect that LTS 18, which demonstrates a low IFT, would foam rapidly. Although LTS 18 (Test 71 in Table 2) appeared to foam more rapidly than the other typical steam foam surfactants, IOS 1517 and IOS 1720 clearly foamed more rapidly in the sand pack tests. It may be concluded from these IFT results that the more rapid foaming exhibited by internal olefin sulfonate surfactants cannot be attributed to the surfactant efficiently displacing crude oil from the sand pack region adjacent to the injection port, and that IFT values are not useful in determining whether or not a surfactant will foam rapidly.

In general, a surfactant which demonstrates a lower IFT value will achieve a lower final residual oil saturation ($ROS_f$). If IFT effects controlled oil recovery, one would expect LTS 18, which exhibits a lower IFT value, would achieve a lower $ROS_f$ value. However, IOS 1517 and IOS 1720 achieved $ROS_f$ values comparable to those achieved by LTS 18 (as shown in Table 2). This is particularly significant because the rapidly foaming surfactants achieved these comparable $ROS_f$ values with less total surfactant injected and over a shorter time period.

It may be concluded from both the IFT measurements and the sand pack tests that use of the rapidly foaming surfactants can result in a more rapid oil recovery than would be achieved using typical steam foam surfactants. This would be especially apparent in a steam foam soak operation.

Various modifications of the present invention will become apparent to those skilled in the art from the foregoing description. Such modifications are intended to fall within the scope of the appended claim.

What is claimed is:

1. A process for recovering oil from a subterranean reservoir penetrated by at least one well through use of a steam foam process comprising:

(a) injecting into the reservoir a first steam foam mixture containing steam and a first surfactant selected from the group consisting of secondary alkane sulfonates;
(b) forming a foam within the reservoir sufficient to substantially increase injection pressure at the well;
(c) injecting into the reservoir a second steam foam mixture containing steam and a second steam foam surfactant after the injection pressure increases; and
(d) recovering oil from the reservoir.

2. The process of claim 1 wherein the second surfactant is selected from the group consisting of alpha olefin sulfonates, alkyltoluene sulfonates, alkyxylene sulfonates, and alpha olefin sulfonate dimers.

3. The process of claim 1 wherein the reservoir contains only one well for both injection and production, the steam foam process is a steam foam soak process, and the cycle of steps (a), (b), and (c) is repeated at least once.

4. The process of claim 3 wherein the second surfactant is selected from the group consisting of alpha olefin sulfonates, alkyltoluene sulfonates, alkyxylene sulfonates, and alpha olefin sulfonate dimers.

5. A method of obtaining rapid mobility control in a steam foam process for recovering oil from a subterranean reservoir penetrated by at least one well, comprising:
injecting into the reservoir a steam foam mixture containing steam and a surfactant selected from the group consisting of secondary alkane sulfonates; and
forming a foam in the reservoir sufficient to provide a rapid increase in injection pressure and mobility control for subsequent injections of steam and a surfactant.

6. The process of claim 5 wherein the reservoir contains only one well for both injection and production and the steam foam process is a steam foam soak process.

7. A process for recovering oil from a subterranean reservoir through use of a single well, comprising:
injecting into the reservoir a steam foam mixture comprising:
(a) steam, which includes about 10 to 90 wt % vapor phase;
(b) surfactant solution containing a surfactant, selected from the group consisting of:

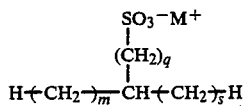

Where:
m = 1 − 33,
q = 0 or 1,
s = 1 − 10 when q = 1, or 2 − 10 when q = 0,
M = sodium, potassium, or ammonium, and
m + 1 + q + s = 10 − 36.
and present in the solution at a concentration of from about 0.01 wt % to about 10 wt %;
(c) electrolyte, present in the surfactant solution at a concentration of from about 0.01 wt % to about 15.0 wt %; and (d) noncondensible gas, present in the gaseous phase of the mixture in an amount of from about 0.01 mol % to about 50 mol %;
displacing the steam foam mixture away from the well with additional steam;
shutting in the well to allow the steam to soak within the reservoir; and
recovering oil from the reservoir through the well.

8. In a steam foam process for recovering oil by injecting a fluid containing steam and a surfactant through a well and into a subterranean reservoir in which the formation of foam by the surfactant is inhibited by properties of the reservoir, the improvement which comprises:
initially injecting into the reservoir steam and a first surfactant, wherein the surfactant is selected from the group consisting of secondary alkane sulfonates;
forming a foam near the well that provides a rapid increase in injection pressure and mobility control at the well; and
subsequently injecting steam and a second surfactant.

9. In a steam foam process for recovering oil from a subterranean reservoir by injecting a fluid containing steam and a surfactant through a well and into the reservoir, the improvement which comprises:
injecting into the reservoir steam and surfactant, wherein the surfactant is selected from the group consisting of secondary alkane sulfonates.

10. A process for recovering oil from a subterranean reservoir penetrated by at least one well through use of a steam foam process comprising:
(a) injecting into the reservoir a first steam foam mixture containing steam and a rapidly foaming first surfactant selected from the group consisting of internal olefin sulfonates and vinylidene olefin sulfonates;
(b) forming a foam within the reservoir sufficient to substantially increase injection pressure at the well, wherein the foam is formed within a few hours of when the first steam foam mixture is injected into the reservoir;
(c) injecting into the reservoir a second steam foam mixture containing steam and a second steam foam surfactant after the injection pressure is increased, wherein the second surfactant is selected from the group consisting of alpha olefin sulfonates, alkyltoluene sulfonates, alkyxylene sulfonates, and alpha olefin sulfonate dimers; and
(d) recovering oil from the reservoir.

11. The process of claim 10 wherein the reservoir contains only one well for both injection and production, the steam foam process is a steam foam soak process, and the cycle of steps (a), (b), and (c) is repeated at least once.

12. A process for recovering oil from a subterranean reservoir through use of a single cell, comprising:
injecting into the reservoir a steam foam mixture comprising:
(a) steam, which includes about 10 to 90 wt % vapor phase;
(b) surfactant solution containing a rapidly foaming surfactant, selected from the group consisting of:

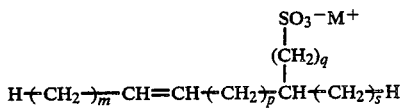

Where:
- m=1—31,
- p=0—10,
- q=0 or 1,
- s=1—10 when q=1, or 2—10 when q=0,
- M=sodium, potassium, or ammonium, and
- m+2+p+1+q+s=10—36.

and present in the solution at a concentration of from about 0.01 wt % to about 10 wt %;

(c) electrolyte, present in the surfactant solution at a concentration of from about 0.01 wt % to about 15.0 wt %; and (d) noncondensible gas, present in the gaseous phase of the mixture in an amount of from about 0.01 mol % to about 50 mol %;

forming a foam in the reservoir sufficient to substantially increase injection pressure at the well within a few hours of when injection into the reservoir of the rapidly foaming surfactant is initiated;

displacing the foam out from the well with additional steam;

shutting in the well to allow the steam to soak within the reservoir; and recovering oil from the reservoir through the cell.

13. A process for recovering oil from a subterranean reservoir penetrated by at least on injection well and one production well, comprising:

injecting into the reservoir a steam foam mixture comprising:

(a) steam, which includes about 10 to 90 wt % vapor phase;

(b) surfactant solution containing a rapidly foaming surfactant, selected from the group consisting of:

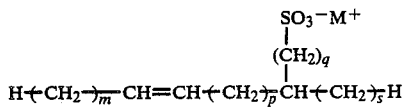

Where:
- m=1—31,
- p=0—10,
- q=0 or 1,
- s=1—10 when q=1, or 2—10 when q=0,
- M=sodium, potassium, or ammonium, and
- m+2+p+1+q+s=10—36.

and present in the solution at a concentration of from about 0.01 wt % to about 10 wt %;

(c) electrolyte, present in the surfactant solution at a concentration of from about 0.01 wt % to about 15.0 wt %; and (d) noncondensible gas, present in the gaseous phase of the mixture in an amount of from about 0.01 mol % to about 50 mol %;

forming a foam in the reservoir sufficient to substantially increase injection pressure at the injection well within a few hours of when injection into the reservoir of the rapidly foaming surfactant is initiated;

displacing the foam within the reservoir with additional steam; and recovering oil from the reservoir through the production well.

* * * * *